United States Patent
Nakamura et al.

(10) Patent No.: US 6,404,091 B1
(45) Date of Patent: Jun. 11, 2002

(54) AUTOMOTIVE AC GENERATOR

(75) Inventors: Shigenobu Nakamura, Anjo; Tsutomu Shiga, Aichi-ken, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/477,402

(22) Filed: Jan. 4, 2000

(30) Foreign Application Priority Data

Jun. 1, 1999 (JP) .................................. 11-153930

(51) Int. Cl.$^7$ .............................. H02K 3/48; H02K 3/12
(52) U.S. Cl. .......................................... 310/179; 310/51
(58) Field of Search .............................. 310/179, 180, 310/201, 51, 260, 263

(56) References Cited

U.S. PATENT DOCUMENTS

| | | | |
|---|---|---|---|
| 4,525,642 A | * 6/1985 | Humphries et al. | 310/260 |
| 5,994,802 A | * 11/1999 | Shichijyo et al. | 310/51 |
| 5,994,813 A | * 11/1999 | Umeda et al. | 310/180 |

FOREIGN PATENT DOCUMENTS

| | | |
|---|---|---|
| DE | 40 31 276 A | 4/1992 |
| DE | 195 29 392 A | 2/1997 |
| EP | 0 881 745 A | 12/1998 |
| EP | 0 881 752 A | 12/1998 |
| GB | 2 304 236 | 3/1997 |
| JP | 62-037041 | * 2/1987 .................. 310/179 |
| JP | 03-118742 | * 5/1991 .................. 310/180 |
| WO | WO 92/06527 | 4/1992 |
| WO | WO 98/54823 | 12/1998 |

OTHER PUBLICATIONS

"Winding Alternating–Current Machines"; Liwschitz–Garik, D. Van Nostrand Company Inc., pp. 13–15, Oct. 1950.*

* cited by examiner

*Primary Examiner*—Karl Tamai
(74) *Attorney, Agent, or Firm*—Oliff & Berridge, PLC

(57) ABSTRACT

An automotive ac generator is provided which may be used in passenger vehicles and trucks and which is designed to minimize vibrations of coils of a stator during operation. The generator includes a hollow cylindrical stator core and a plurality of electrical conductors. The stator core surrounds the periphery of the rotor and has formed therein a plurality of slots in which the electrical conductors are disposed. The electrical conductors disposed in one of the slots are connected to those in another slot through conductive bridges, respectively, to form the coils of the stator. The conductive bridges project from the opposed ends of the stator core and are so designed as to resonate outside a normal speed range of the ac generator to minimize the vibrations of the coils of the stator inducing unwanted magnetic noises.

5 Claims, 5 Drawing Sheets

AUTOMOTIVE AC GENERATOR

BACKGROUND OF THE INVENTION

1. Technical Field of the Invention

The present invention relates generally to an automotive ac generator for use in passenger vehicles and trucks, and more particularly to an ac generator designed to minimize vibrations of coils during operation.

2. Background Art

Recently, there are increasing needs for high power of ac generators for automotive vehicles involved in increasing electrical load consumed by safety control devices etc. and for reduction in magnetic noise produced by the ac generators for meeting environmental requirements to decrease noise outside the vehicles and improvement of silence in a vehicle cabin.

International Patent Publication No. WO98/54823 discloses an automotive ac generator which is designed to increase an output power by connecting ends of stator windings of a coil using a plurality of conductive segments in the same pattern in a circumferential direction of the coil to eliminate the interference between the stator windings and to improve the space factor and the cooling of the stator windings. Additionally, the ac generator is also designed to combine outputs from two groups of windings different in phase to reduce magnetic noises.

International Patent Publication No. WO92/06527 discloses a manufacturing method of a stator using a plurality of conductive segments.

Usually, the generation of magnetic noises is caused by magnetic pulsation in a gap between a stator and a rotor of an ac generator which produces vibrations of a core of the stator which are, in turn, transmitted to a frame and its brackets etc. mounted on the side of an engine body and then radiated as compressional waves of air. Additionally, when the natural frequency of ends of coils wound in slots of the stator extending in an axial direction of the stator agrees with the frequency of the magnetic pulsation, it will cause the ends of the coils to resonate, thereby resulting in an increase in radiation of magnetic sound from the ends of the coils.

Particularly, most of modern automotive ac generators have internal cooling fans and many ventilating windows formed in a frame facing ends of coils. The magnetic noises are, thus, emitted directly outside the ventilating windows without being blocked by the frame. Additionally, when the ends of the coils are resonating, a vibrational component of the resonation in a circumferential direction of the coils acts to rotate a stator core retained by the frame in an axial direction of the coils. If, therefore, the resonation of the coil end is repeated, it will cause the stator core to rub against an inner wall of the frame, resulting in excessive wear of the frame because the frame is usually made of a light weight and non-magnetic material such as aluminum. The wear of the frame will causes a fixative power serving to hold the stator core in an axial direction thereof to be lowered, thereby resulting in an increase in vibration of the stator core induced by the magnetic pulsation, leading to an increase in magnetic noise. Even when the natural frequency of the ends of the coils agrees an integral multiple of (more than two times) the frequency of the magnetic pulsation, the circumferential vibrations of the coil ends are not produced as much as when resonating, but increase.

International Patent Publication No. WO98/54823, as discussed above, fails to teach how to reduce the circumferential vibrations of the coil ends. The structure, as disclosed in International Patent Publication No. WO92/06527 has two conductive segments arrayed in each slot in the same radial direction. An increase in vibration in the circumferential direction of coil ends, thus, cause the conductive segments to rub on each other, which may result in damage of insulating coatings on surfaces of the conductive segments, thereby short-circuiting the conductive segments.

The above described International Patent Publication Nos. WO98/54823 and WO92/06527 do not refer to the resonance frequency of the coil ends of the automotive ac generators at all. The present invention takes it into consideration and provides an idea that an increased degree of rigidity is added to ends of coils of an ac generator to shift the resonance frequency outside a normal speed range of the ac generator.

SUMMARY OF THE INVENTION

It is therefore a principal object of the present invention to avoid the disadvantages of the prior art.

It is another object of the present invention to provide an ac generator designed to minimize resonance of coil ends in a circumferential direction thereof to reduce magnetic noises.

It is a further object of the invention to provide an ac generator designed to avoid electrical short of coil ends caused by vibrations of the coil ends during operation.

According to one aspect of the invention, there is provided an automotive ac generator which comprises: (a) a rotor having a magnetic core, the rotor rotating within a preselected speed range; (b) a stator including a hollow cylindrical stator core having opposed ends and a plurality of electrical conductors, the stator core surrounding a periphery of the rotor and having formed therein a plurality of slots in which the electrical conductors being disposed; (c) a pair of cup-shaped frames retaining the stator; and (d) conductive bridges projecting from the opposed ends of the stator core and connecting the electrical conductors disposed in one of the slots and the electrical conductors disposed in another slot to form stator windings, the conductive bridges being so designed as to resonate outside the preselected speed range of the rotor.

In the preferred mode of the invention, the electrical conductors disposed in each of the slots are arrayed in a radial direction. Each of the conductive bridges includes two slant sections which define two equal sides of substantially isosceles triangle and which make an angle of more than 100° with each other.

The electrical conductors disposed in each of the slots are insulated electrically from each other and are made of at least two conductive layers: one is an outer conductive layer disposed close to an outer peripheral wall of the stator core and the other is an inner conductive layer disposed close to an inner peripheral wall of the stator core. The outer conductive layer in each of the slots is connected in series through one of the conductive bridges to the inner conductive layer in another slot to form one of the stator windings.

The outer conductive layer and the inner conductive layer which are connected to each other through one of the conductive bridges are formed by a single U-shaped conductive member having a curved portion constituting the one of the conductive bridges.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
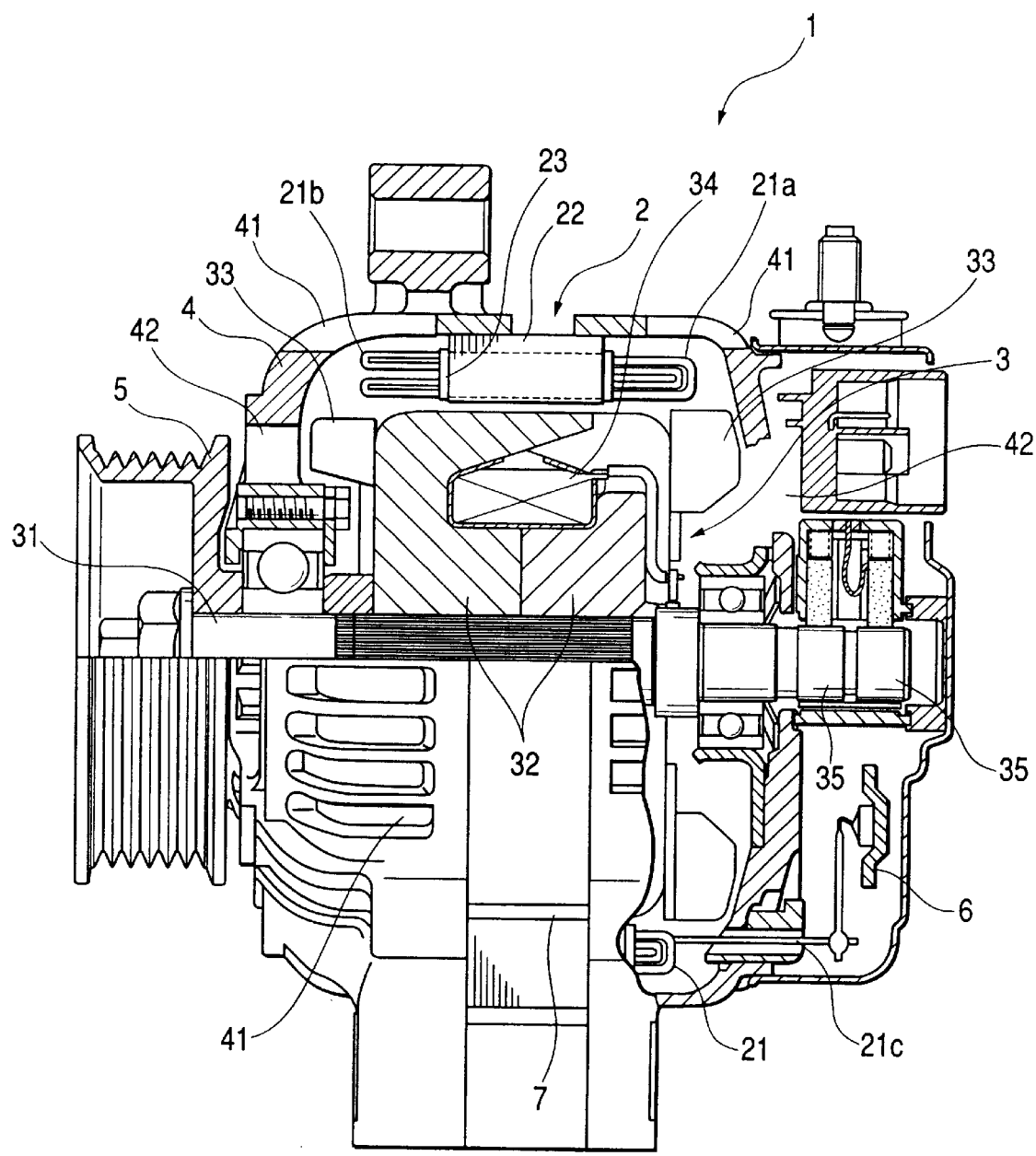
FIG. 1 is a partially sectional view which shows an ac generator according to the present invention.

Referring now to the drawings, wherein like numbers refer to like parts in several views, particularly to FIG. 1, there is shown an ac generator 1 for use in automotive vehicles according to the present invention.

The ac generator 1 consists essentially of a stator 2 serving as an armature, a rotor 3 producing a magnetic field, a pair of cup-shaped frames 4 supporting the rotor 3 and the stator 2, and a rectifier 6. The rectifier 6 is connected to an output line 21c of a stator winding 21 and converts ac current into dc one.

The rotor 3 includes a shaft 31, a Lundell-type magnetic core 32, cooling fans 33, a field coil 34, and a pair of slip rings 35.

The shaft 31 is joined to a pulley 5 and rotated by, for example, a combustion engine (not shown) mounted in a vehicle.

The Lundell-type magnetic core 32 is secured on the shaft 31 and surrounds the field coil 34 through which an exciting current flows through the slip rings 35 mounted on a rear end of the shaft 31. The cooling fans 33 are installed on end walls of the magnetic core 32 by, f or example, welding or cramping so that it can rotate together with the rotor 3 to produce cooling wind.

The frames 4 have air inlets 42 formed in an end wall thereof through which fresh air is introduced to the cooling fans 33 and air outlets 41 formed in peripheral portions thereof facing first and second coil end groups 21a and 21b of the stator 2. The frames 4 are joined to each other through bolts 7 to retain the stator core 22 there between.

Figure 2:
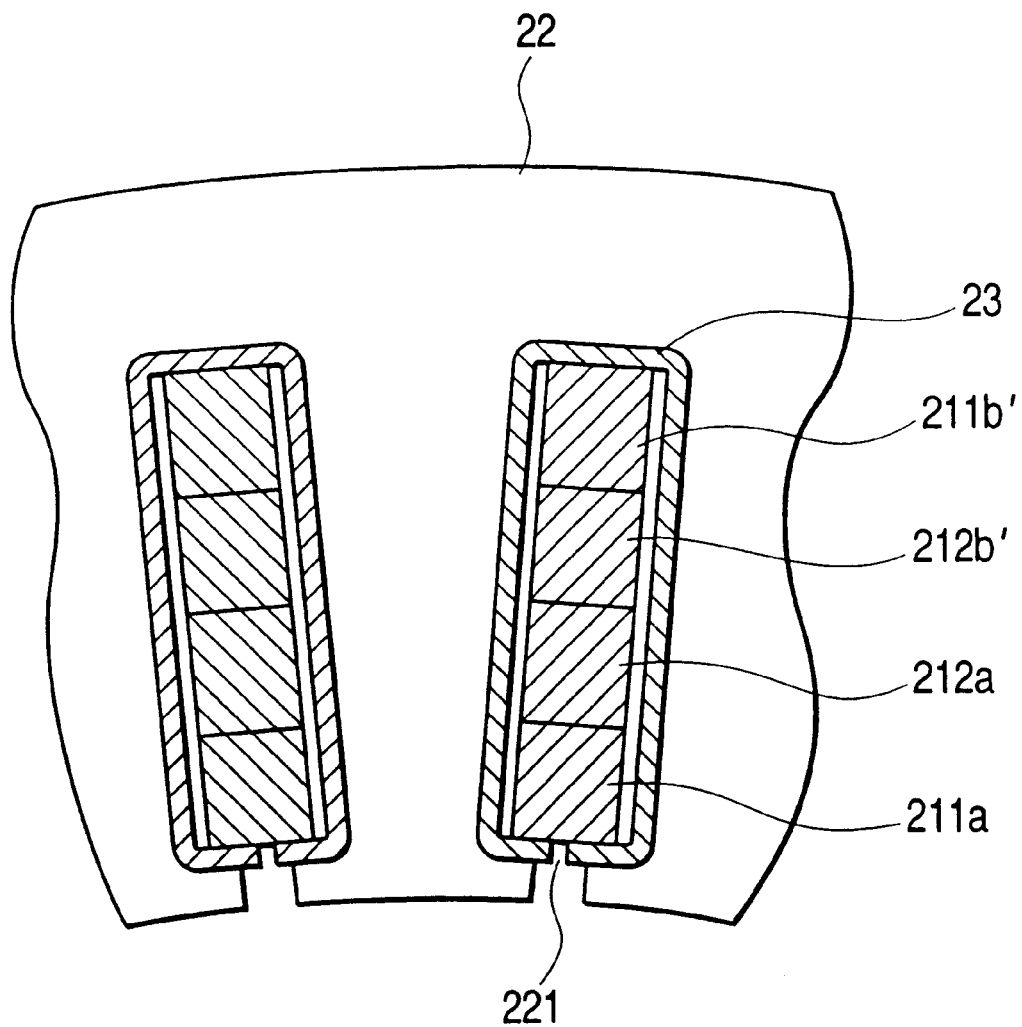
FIG. 2 is a partially sectional view which shows conductive layers disposed in slots formed in a stator core.

The stator 2 includes the stator core 22, the stator windings 21, and insulators 23. The stator core 22 is made of a hollow cylindrical member and has, as clearly shown in FIG. 2, a plurality of slots 221 formed therein radially at regular intervals. In this embodiment, the three-phase stator windings 21 are installed or pass through the thirty six slots 221 of a number determined according to the number of magnetic poles of the rotor 3. The insulators 23 electrically insulate the stator core 22 from the stator windings 21.

Each of the stator windings 21 consists of even electrically conductive members. In this embodiment, each of the stator windings 21 consists of four conductive members which are insulated from the stator core 22 by the insulator 23 and coated with an insulating film to be insulate d from each other. The four conductive members installed in each of the slots 221 are, as clearly shown in FIG. 2, overlaid in a radial direction of the stator core 22 to form an innermost layer 211a, an inner middle layer 212a, an outer middle layer 212b', and an outermost layer 211b' which are, as will be described below in detail, connected in a given pattern to those disposed in the other slots 221 to form one of the stator windings 21.

Figure 3:
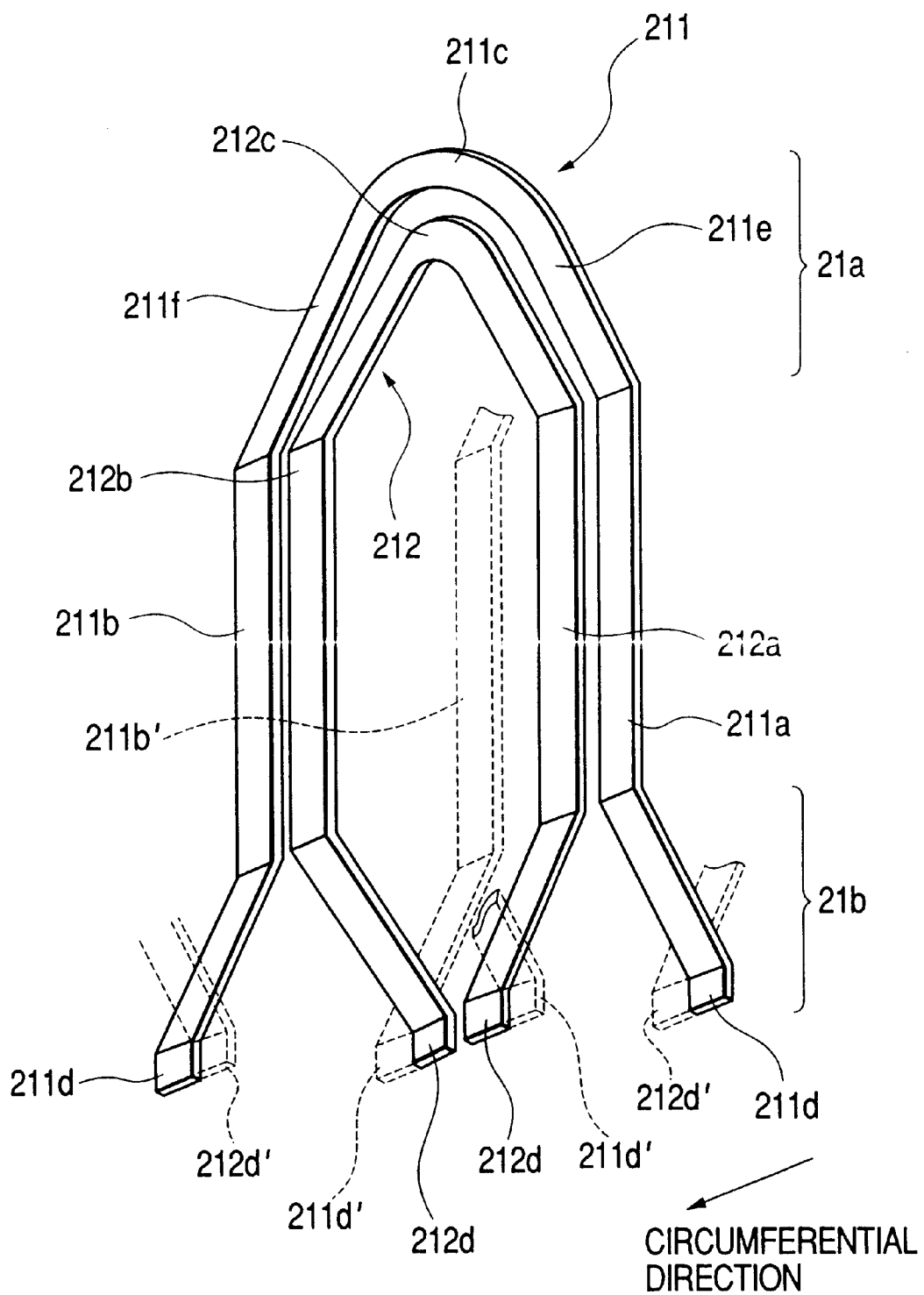
FIG. 3 is a perspective view which shows a larger and a smaller conductive segments forming stator windings.

Specifically, the innermost layer 211a disposed in each of the slots 221 is, as shown in FIG. 3, connected through a connecting bridge 211c to the outermost layer 211b disposed in another one of the slots 221 spaced at a one magnetic pole interval in a counterclockwise direction of the stator core 22 to form a U-shaped larger conductive segment 211. Similarly, the inner middle layer 212a disposed in each of the slots 221 is connected through a connecting bridge 212c to the outer middle layer 212b disposed in the one of the slots to form a U-shaped smaller conductive segment 212. If the larger conductive segment 211 and the smaller conductive segment 212 forms one conductive segment pair, as many conductive segment pairs as the slots 221 are prepared and arrayed in the slots 221 of the stator core 22 in an annular form. The connecting bridges 211c and 212c project, as clearly shown in FIG. 1, from the rear end of the stator core 22 to form the first coil end group 21a. The connecting bridge 211c of each of the large conductive segments 211 extends over the connecting bridge 212c of the smaller conductive segments 212.

The larger conductive segments 211 and the smaller conductive segments 212 have ends projecting from the front end of the stator core 22 to form, as shown in FIG. 1, the second coil end group 21b. The ends 211d of the larger conductive segment 211 of each conductive segment pair are, as shown in FIG. 3, connected to the ends 212d' of the smaller conductive segment 212 of another conductive segment pair, as indicated by broken lines, to form conductive bridges (i.e., half of the coil ends in the second coil end group 21b). The ends 212d of the smaller conductive segment 212 of each conductive segment pair are connected to the ends 211d' of the larger conductive segment 211 of another conductive segment pair, as indicated by broken lines, to form conductive bridges (i.e., the remainder of the coil ends of the second coil end group 21b). Specifically, the ends 211d and 211d' of the larger conductive segments 211 (also referred to as slant sections of the conductive bridges below) and the ends 212d and 212d' of the smaller conductive segment 212 (also referred to as slant sections of the conductive bridges below) are connected in this manner to form one of the stator windings 21.

Figure 4:
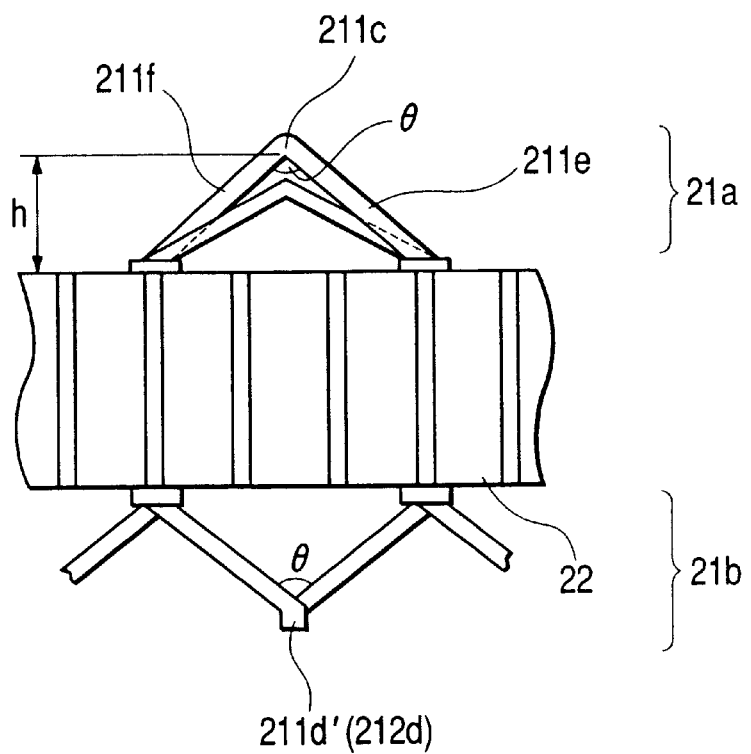
FIG. 4 is a side view, as viewed from the inside of a stator, which shows slots and connecting bridges projecting from ends of the stator.

Each of the connecting bridges 211c of the first coil end group 21a includes, as shown in FIG. 4, two slant sections 211e and 211f which define the first isosceles triangle along with the rear end wall of the stator core 22. Similarly, the ends 212d and 211d' of the second coil group 21b defines the second isosceles triangle along with the front end wall of the stator core 22. The angle θ between the slant sections 211e and 211e, that is, between two sides of the first isosceles triangle having equal length is 100°. Similarly, the angle θ between the ends 212d and 211d' of the second isosceles triangle is also 100°. The base of each of the first and second isosceles triangles (i.e., an N-to-S magnetic pole pitch) is 24 mm.

The innermost layer 211a, the inner middle layer 212a, the outer middle layer 212b, and the outermost layer 211b' are, as described above in FIG. 2, overlaid with each other in the radial direction of the stator core 22. Each of the layers 211a, 212a, 212b, and 211b' has a rectangular cross section measuring 1.4 mm wide and 2.2 mm long.

The peripheral surface of the rotor 3, as can be seen in FIG. 1, faces the inner wall of the stator core 2 through a gap. When the ac generator 1 is operating to produce the electric power, a magnetic flux produced in the gap pulsates in synchronism with rotation of the rotor 3, thereby resulting in a variation in magnetic force between the stator core 22 and the rotor 3. The basic frequency f0 (Hz) of the pulsation of the magnetic flux may be expressed as $$f0=(n \times T \times P)/60 \qquad (1)$$

where n is the revolution speed per minute of the rotor 3, T is the number of phases of the windings of the rotor 3, and P is the number of NS magnetic poles of the rotor 3.

When the magnetic flux pulsates at the basic frequency f0, a variation in magnetic force reaches a maximum value. The variation in magnetic force also has a frequency component that is small in magnetic level, but is an integral multiple of f0.

Figure 5:
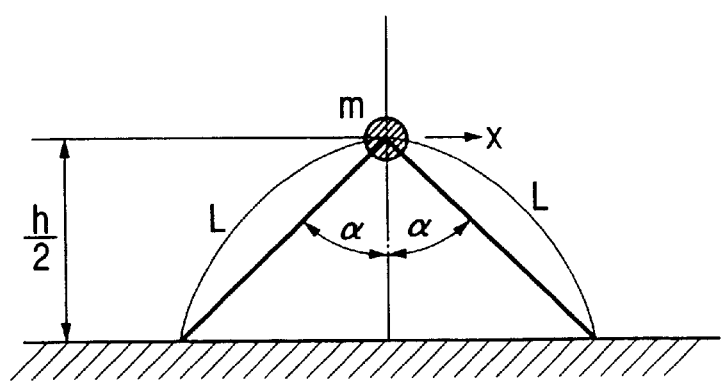
FIG. 5 is an illustration which shows a model of an coil end of a stator used in determining a natural frequency in a circumferential direction of the stator.

The natural frequency fx of each coil end, as defining two equal sides (i.e., the slant sections 211e and 211f or the ends 212d and 211d') of each of the first and second isosceles triangles in the first and second coil end groups 21a and 21b, of the stator windings 21 in a circumferential direction of the stator core 22 may be represented using a triangular model as shown in FIG. 5 as $$fx=(½\pi) \cdot \omega x \qquad (2)$$

$$(\omega x)^2 = 2EA(\sin \alpha)^2/(L \cdot m) \qquad (3)$$

where E is the Young's modulus of copper, L is the length of each of two slant conductors, A is the sectional area of the slant conductors, α is half an angle between the slant conductors, and m is the mass of the slant conductors. Since a mass distribution of the slant conductors is uniform, the mass m may be viewed as being located at an interval equivalent to half a height h, as shown in FIG. 4, of the top of the first and second isosceles triangles from the end wall of the stator core 22. In FIG. 5, x indicates the circumferential direction of the stator core 22.

Thus, substituting suitable values into the above equations (2) and (3), we obtain $$fx=11.6(kHz)$$

For T=3 and P=12, substituting a resonance condition of f0=fx into equation (1), the rotor speed n inducing the resonance is $$n=19300 \text{ [rpm]} \qquad (4)$$

Usually, an engine speed range when an automotive vehicle runs on a normal road in an urban or a suburban area, that is, a normal speed range is approximately 600 rpm when idling to 5000 rpm. A speed ratio of an automotive engine to an ac generator is typically set to 2 to 3. A speed range of the ac generator when the automotive vehicle runs on the normal road will, thus, be 1200 rpm to 15000 rpm. Therefore, the resonance speed, as indicated by equation (4), lies outside the speed range of the ac generator when the automotive vehicle runs on the normal road, thereby restricting the coil ends of the ac generator from resonating in the circumferential direction thereof (i.e., the x-direction in FIG. 5). Specifically, a rapid increase in magnetic noise arising from the coil ends of the ac generator 1 and wear of a contact surface of the frame 4 with the stator core 22 are avoided, thereby minimizing the magnetic noises caused by a decrease in fixative power to hold the stator core 22 in the axial direction thereof.

As described above, the variation in magnetic force caused by the magnetic pulsation has a frequency component that is small in magnetic level, but is an integral multiple of the basic frequency f0. From equation (1), the speed n corresponding to a secondary frequency component (i.e., a double frequency) if the natural frequency fx is represented by equation (2) is half the value in equation (4), and the speed n corresponding to a tertiary frequency component is one-third of the value in equation (4). These speeds, thus, lie within the speed range of the ac generator when the automotive vehicle runs on the normal road (i.e., 1200 rpm to 15000 rpm). Frequency components other than the primary frequency component of the variation in magnetic force are usually too small to induce the rapid increase in magnetic noise. Further, in this embodiment, the conductive segments are arrayed in line in the same radial direction in each of the slots 221, so that a gap is always produced between the adjacent slant sections located in the same radial direction of the stator core 22, thereby preventing the adjacent slant sections from being short-circuited.

Since the angle θ between the slant sections 211e and 211f of the larger conductive segment 211 extending outside the smaller conductive segment 212 is, as described above, 100°, the angle of the connecting bridge 212c of the smaller conductive segment 212 is always more than 100°. Therefore, the angle α in equation (3) becomes great, so that the natural frequency fx of the smaller conductive segment 212 will exceed that of the larger conductive segment 211, thereby avoiding the resonance of the smaller conductive segment 212.

The resonance of the coil ends of the stator windings 21 in the radial direction of the stator core 22 may be expressed using a model of a beam which is supported at one end and which has a weigh m. The natural frequency fz of such a model may be represented by the following equation.

$$fz=(½\pi) \cdot \omega z \qquad (5)$$

$$(\omega x)^2 = 12EI/h^3 \cdot m \qquad (6)$$

where I is the geometrical moment of inertia of a rectangular sectional area of the beam.

If the length of the rectangular sectional area in the radial direction and the length thereof in a direction perpendicular to the circumferential direction are defined as a and b, respectively, I may be expressed as $$I=(1/12)a \cdot b^3$$

Figure 6:
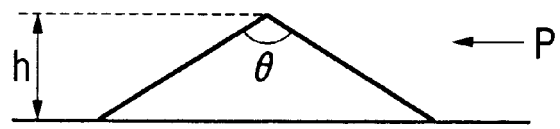
FIGS. 6 and 7 show a mode of an coil end of a stator used in determining a natural frequency in a radial direction of the stator.
Figure 7:
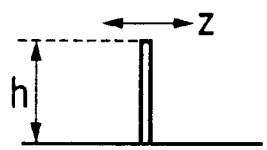

FIGS. 6 and 7 show a model using two electrical conductors each having a rectangular sectional area. In the model, the two conductors forms the single beam of the former model. The values of a and b will thus be twice, so that the geometrical moment of inertia I will be 16 times that in the former model. Therefore, the natural frequency fz in the radial direction Z is 9100 [Hz]. From equation (1), a corresponding speed n of the rotor 3 is 15200 rpm which lies outside the speed range of the ac generator when the automotive vehicle runs on the normal road (i.e., 1200 rpm to 15000 rpm). Increasing the angle θ above 100° will cause the height h of the beam, as shown in FIGS. 6 and 7, to be decreased, which results in an increase in natural frequency fz, thereby preventing the coil ends from resonating further.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

In the above described embodiment, the number of NS magnetic poles Pis 12, and the N-to-S magnetic pole pitch is 24 mm, but they may have any other values. In this case, the angles θ, as shown in FIG. 4, may be more than 100° in order to set the natural frequency fx greater than the magnetic pulsation frequency f0.

Figure 8:
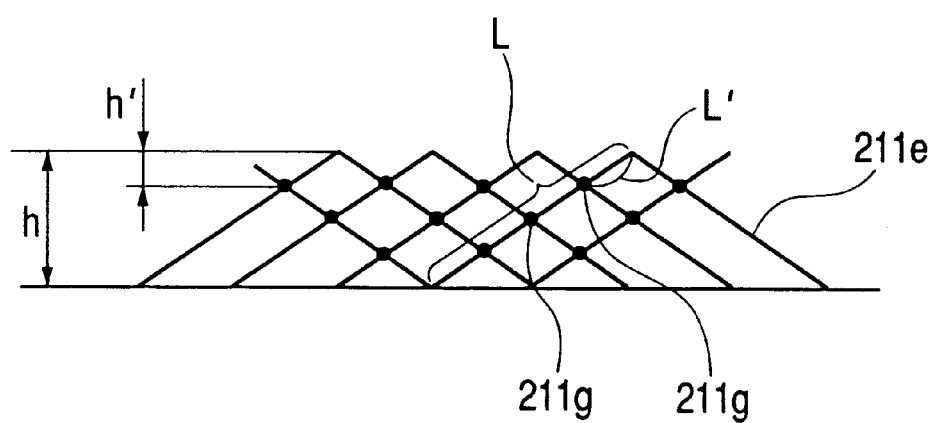
FIG. 8 is an illustration which shows connections of adjacent connecting bridges in a modified form of the invention.

The connecting bridges 211c and 212c of the larger and smaller conductive segments 211 and 212 may be covered at intersecting portions thereof, as indicated by 211g in FIG. 8, with insulating resin material. In this case, the length L of one beam (i.e., the slant section 211e or 211f may be considered as a shorter one L', and the height h may also be considered as a lower one h'. The natural frequencies fx of the coil ends in the circumferential and radial directions will, thus, be increased, thereby avoiding the resonance of the coil ends when the automotive vehicle runs on the normal road. The same structure may apply to the second coil end group 21b.

What is claimed is:

1. An automotive ac generator comprising:

a rotor having a magnetic coil, said rotor rotating within a preselected speed range;

a stator including a hollow cylindrical stator core having opposite ends and a plurality of electrical conductors, the stator core surrounding a periphery of said rotor and having formed therein a plurality of slots in which the electrical conductors are disposed;

a pair of cup-shaped frames retaining said stator; and conductive bridges projecting from the opposite ends of said stator core and connecting the electrical conductors disposed in one of the slots and the electrical conductors disposed in another slot to form stator windings;

wherein each of said conductive bridges includes two slant sections, each having the same length, which define two equal sides of a substantially isosceles triangle and which make an angle of more than 100° with respect to each other, said length and said angle being selected so that said conductive bridges resonate at a frequency outside the preselected speed range of said rotor; and wherein said stator windings comprise a plurality of generally U-shaped conductor members, each of said electrical conductors being formed by a straight portion of one of said generally U-shaped conductor members; each of the conductive bridges projecting from one end of said stator core being formed by a bottom, turn portion of one of said generally U-shaped conductor members; and each of the conductive bridges projecting from the opposite end of said stator core being formed by opposite, end portions of said generally U-shaped conductor members, the conductive bridges projecting from said opposite end of said stator core each having a pair of slant portions which extend without twisting.

2. An automotive ac generator as set forth in claim 1, wherein the electrical conductors disposed in each of the slots are insulated electrically from each other and are made of at least two conductive layers: one is an outer conductive layer disposed close to an outer peripheral wall of the stator core and the other is an inner conductive layer disposed close to an inner peripheral wall of the stator core, and wherein the outer conductive layer in each of the slots is connected in series through one of said conductive bridges to the inner conductive layer in another slot to form one of the stator windings.

3. An automotive ac generator as set forth in claim 2, wherein the outer conductive layer and the inner conductive layer which are connected to each other through one of said conductive bridges are formed by a single U-shaped conductive member having a curved portion constituting the one of said conductive bridges.

4. An automotive ac generator as set forth in claim 1, wherein said preselected speed range of said rotor is approximately 1200–15000 rpm.

5. An automotive ac generator as set forth in claim 1, wherein the ends of said generally U-shaped conductor members are arranged along a radial direction of said stator core and are connected to each other so that said slant portions extend without twisting.

* * * * *